(12) United States Patent
Layton

(10) Patent No.: US 6,462,530 B1
(45) Date of Patent: Oct. 8, 2002

(54) REDUNDANT RATE SENSOR AND METHOD

(75) Inventor: Michael R. Layton, Clayton, CA (US)

(73) Assignee: BEI Technologies, Inc., San Francisco, CA (US)

( * ) Notice: Subject to any disclaimer, the term of this patent is extended or adjusted under 35 U.S.C. 154(b) by 0 days.

(21) Appl. No.: 09/770,792

(22) Filed: Jan. 25, 2001

(51) Int. Cl.[7] .......................... G01R 23/00; G01P 9/00; H03B 5/36

(52) U.S. Cl. ................. 324/76.49; 73/504.16; 331/116 M

(58) Field of Search .............. 324/76.49; 318/564; 73/504.16; 331/116 M; 310/25

(56) References Cited

U.S. PATENT DOCUMENTS

| 3,551,776 | A |   | 12/1970 | Tawfik et al. |
| 3,663,879 | A |   | 5/1972  | Salamon et al. |
| 3,813,990 | A |   | 6/1974  | Coppola et al. |
| 3,881,670 | A |   | 5/1975  | Doniger |
| 4,105,900 | A |   | 8/1978  | Martin et al. |
| 5,533,397 | A | * | 7/1996  | Sugitani et al. .......... 73/504.16 |
| 5,585,562 | A | * | 12/1996 | Kurata et al. ............ 73/504.16 |

FOREIGN PATENT DOCUMENTS

| DE | 29508525 | 9/1996 |
| EP | 0503807  | 9/1992 |
| GB | 2300047  | 10/1996 |

* cited by examiner

Primary Examiner—N. Le
Assistant Examiner—James Kerveros
(74) Attorney, Agent, or Firm—Edward S. Wright

(57) ABSTRACT

Redundant rate sensor and method in which inertial rate is monitored with a plurality of vibratory sensing elements mounted in a single enclosure, signals from the sensing elements are processed to provide an independent rate output signal for each of the sensing elements, and the independent rate output signals are delivered to a connector which is accessible externally of the enclosure.

21 Claims, 4 Drawing Sheets

REDUNDANT RATE SENSOR AND METHOD

BACKGROUND OF THE INVENTION

1. Field of Invention

This invention pertains generally to inertial rate sensors and, more particularly, to a rate sensor with built-in redundancy for use in an automobile stability control system.

2. Related Art

In automobile stability control systems and other applications where safety is critical, redundancy is sometimes employed for greater reliability. That is presently being done on a somewhat limited basis in automobile braking systems, using two complete, stand-alone devices, with the outputs of the two devices being compared for a suitable match by the braking system. This provides a system which is more tolerant of sensor faults than systems which have only one sensor.

Redundancy itself is not a new concept in applications where high reliability is required, and examples of prior art redundant systems are found in U.S. Pat. Nos. 3,551,776, 3,663,879, 3,813,990, 3,881,670 and 4,105,900. In these systems, the outputs of a plurality of separate identical sensors (typically three) are compared by a control system which is an integral part of the redundant system to verify that the primary sensor is functional.

The use of multiple stand-alone sensors to achieve redundancy has certain disadvantages. Each sensor requires a separate mounting location, a separate mounting procedure, and separate cabling which must be routed to the particular mounting location. In applications such as automobiles where cost is critical, the added cost of additional sensors, multiple mounting

OBJECTS AND SUMMARY OF THE INVENTION

It is in general an object of the invention to provide a new and improved rate sensor and method with built-in redundancy.

Another object of the invention is to provide a rate sensor and method of the above character which are particularly suitable for use in automobile stability control systems.

Another object of the invention is to provide a rate sensor and method of the above character which overcome the limitations and disadvantages of the redundant sensors heretofore provided.

These and other objects are achieved in accordance with the invention by providing a redundant rate sensor and method in which inertial rate is monitored with a plurality of vibratory sensing elements mounted in a single enclosure, signals from the sensing elements are processed to provide an independent rate output signal for each of the sensing elements, and the independent rate output signals are delivered to a connector which is accessible externally of the enclosure.

DETAILED DESCRIPTION

Figure 1:
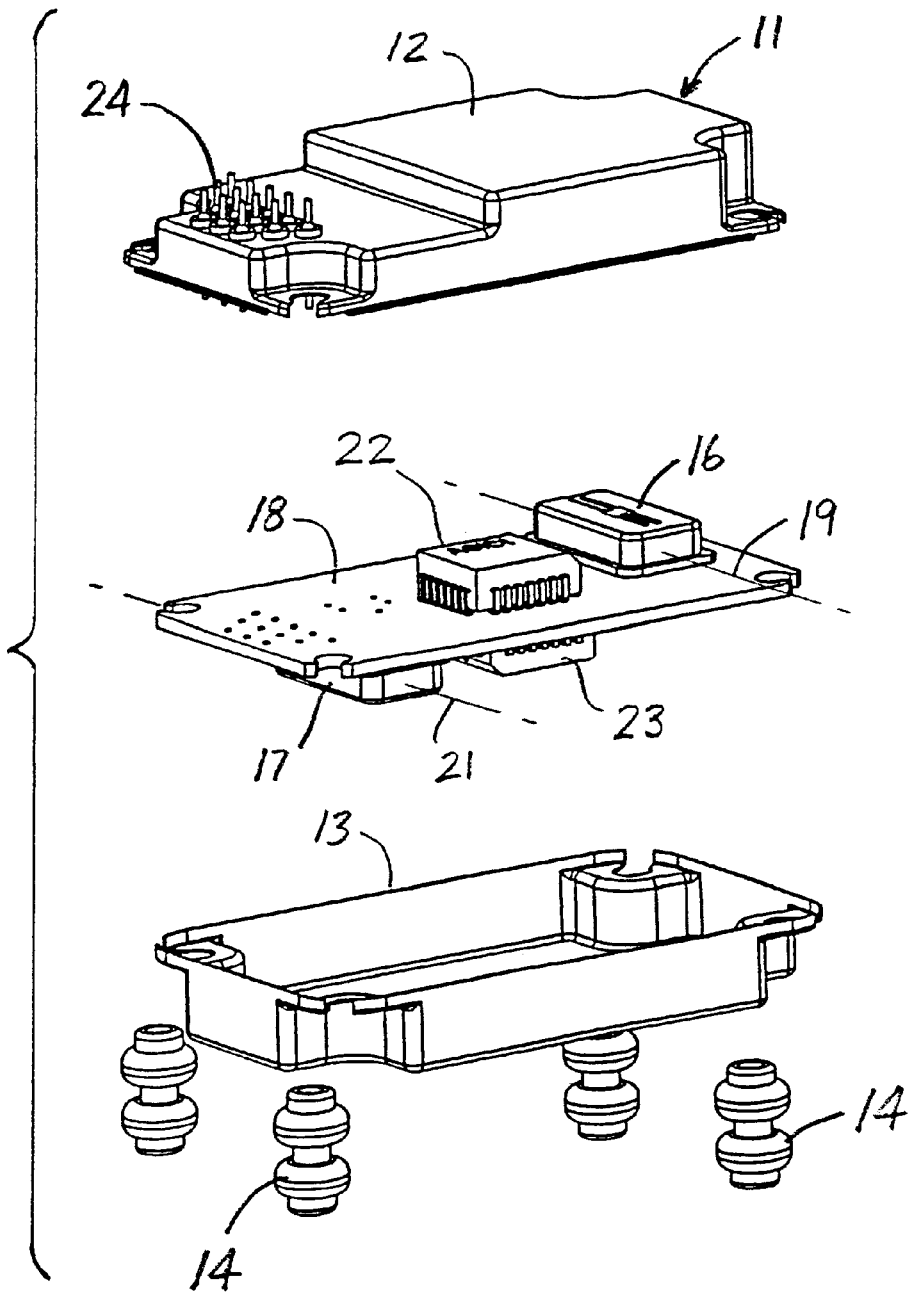
FIG. 1 is an exploded isometric view of one embodiment of a redundant rate sensor incorporating the invention.

As illustrated in FIG. 1, the rate sensor has a relatively flat, generally rectangular housing 11 consisting of an upper section 12 and a lower section 13, with flexible rubber mounts 14 at the corners of the housing for providing mechanical isolation between the sensor and the structure on which it mounted.

A pair of vibratory rate sensing elements in the form of quartz tuning forks 16, 17 are mounted on opposite sides of a printed circuit board 18 within the housing, with the input axes 19, 21 of the tuning forks parallel to each other. Circuitry for processing signals from the tuning forks is included in integrated circuits 22, 23 which are mounted on the circuit board next to the tuning forks, with a separate integrated circuit being provided for each of the tuning forks. These circuits provide independent rate output signals for each of the sensing elements.

A connector assembly 24 is mounted on the housing, with its pins accessible externally of the housing. Connections to the integrated circuits are made through the connector pins. Those connections typically include power and calibration connections as well as the output signals for the two sensors.

This system provides two independent rate output signals, one for each sensor. These outputs are substantially identical in every respect, and they are compared to ensure proper operation of the system. This comparison is generally done by the electronic control unit of the braking system or by signal processors elsewhere in the automobile, and no added benefit is achieved by including that capability within the sensor package.

Other elements such as power conditioning circuitry which serve both channels of the rate sensor can be included within the housing.

Figure 2:
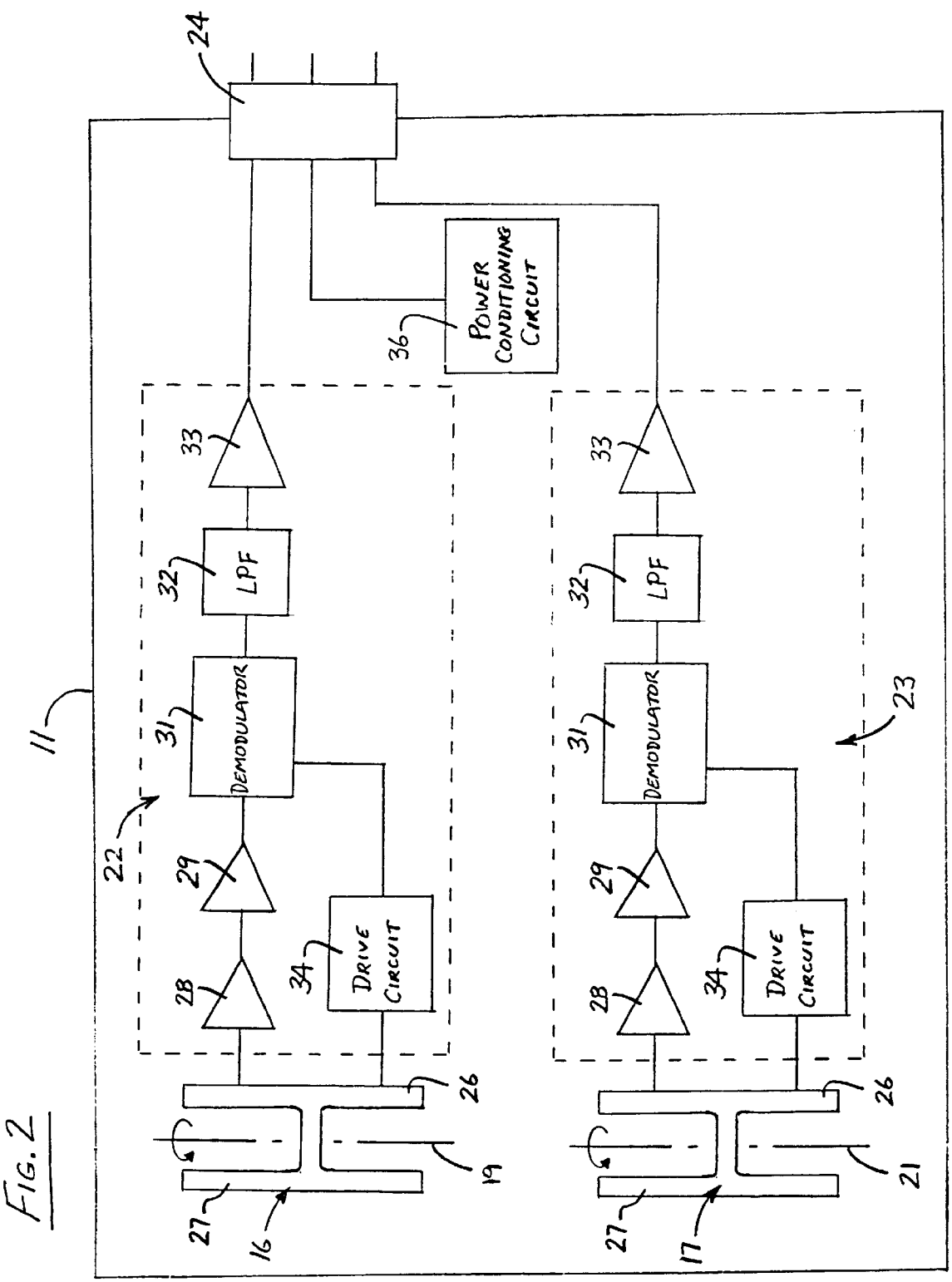
FIG. 2 is a simplified block diagram of the redundant rate sensor in the embodiment of FIG. 1.

As illustrated in FIG. 2, sensing elements 16, 17 are in the form of double ended tuning forks. Each of these tuning forks is fabricated of single crystal quartz material, and has an H-shaped configuration, with drive tines 26 at one end and pick-up tines 27 at the other. Each pair of tines is disposed symmetrically about the input axis 19, 21 of the tuning fork.

The drive tines are driven to oscillate at the natural frequency of the tuning fork and in the plane of the tuning fork. To prevent any unwanted cross-coupling between the two sensing elements and the associated circuitry, different drive frequencies are used for the two tuning forks. The drive frequencies are typically separated by about 1 KHz. When the tuning fork is subjected to rotation about its longitudinal axis, the Coriolis force causes the tines to deflect out of the plane of the fork, stimulating the pickup mode of oscillation. The drive and pickup signals are coupled to the tines in a conventional manner by the use of electrodes (not shown), with the drive signals stimulating mechanical vibration of the tines via the piezoelectric effect and the pickup signals being in the form of electric charge generated by the inverse piezoelectric effect in response to strain produced by the Coriolis force.

With some tuning forks, the pickup frequency is separated from the drive frequency, and error signals can occur as a result of rotational inputs at the separation frequency, typically during vibration of the unit. To increase the likelihood of detecting such errors, different frequency separations can be used for different sensing elements within a unit. Thus, for example, one sensor in a unit might have a separation of about 340 Hz between its drive and pickup frequencies, and the other sensor might have a separation of about 280 Hz. These values are not critical, and any suitable separations can be used.

With a redundant sensor and different frequency separations for the sensors in it, the likelihood of undetected vibration induced errors is greatly reduced because it is highly unlikely that equal vibration induced errors will occur at the separation frequencies of both sensors simultaneously.

Although the sensing elements are illustrated as being double ended tuning forks, other types of vibratory sensing elements, including single ended tuning forks, can be utilized, if desired.

In each channel of the rate sensor, the pickup signals from the tuning fork pass through a charge amplifier 28, to a preamplifier 29, and then to a demodulator 31. The signals from the demodulator pass through a low pass filter 32 and then to an output amplifier 33, with the rate output signal appearing as a baseband signal at the output of the output amplifier.

Excitation signals are applied to the drive tines by a drive circuit 34 which can, for example, be of the type shown in Ser. No. 09/663,742, filed Sep. 15, 2000, the disclosure of which is incorporated herein by reference.

The outputs of the output amplifiers 33 in the two channels are connected to separate pins of output connector 24, and operating power is also supplied to the two channels through the connector and a power conditioning circuit 36 within the housing. Redundant (separate) power conditioning circuits may be used as an option for increased reliability.

In situations where additional redundancy is desired, additional sensing elements and processing circuits can be included within the unit. This may require a modest increase in the size of the housing, but that size package will still be much smaller than three individual, stand-alone units.

In other embodiments, two degrees of freedom of rate sensing output can be provided, with redundancy about one or more axes. In those embodiments, three or more sensing elements are mounted in a single package, with at least one of the elements oriented with its axis perpendicular to the axes of the others in order to sense rotation about a second axis. Redundancy of output is provided by a plurality of sensing elements aligned along one or both of the axes in this device.

Figure 3:
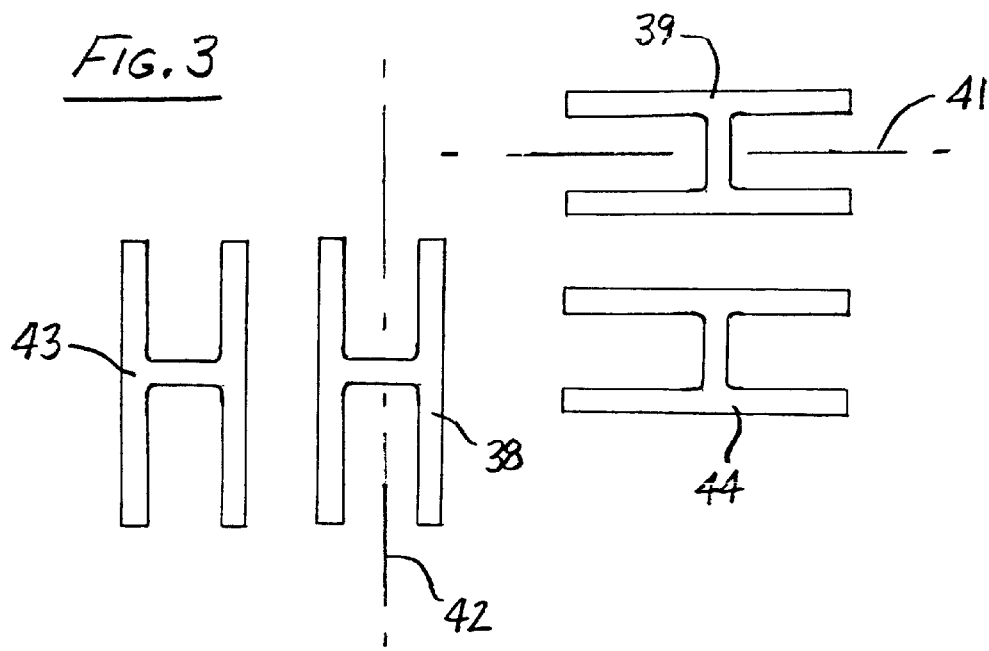
FIGS. 3–6 illustrate additional embodiments of redundant rate sensors incorporating the invention.

Thus, for example, in the embodiment illustrated in FIG. 3, sensing elements 38, 39 are aligned along mutually perpendicular axes 41, 42, with redundancy being provided for each of them by sensing elements 43, 44. As in the embodiment of FIG. 1, a separate processing circuit provides an independent rate output signal for each of the sensing elements in these embodiments.

In another embodiment, one redundant sensing element is shared among two or more orthogonally mounted sensors. In this embodiment, the input axis of the redundant sensing element is positioned at an angle to the input axes of the other sensing elements so that it detects a component of rotation about the input axes of the other elements.

Figure 4:
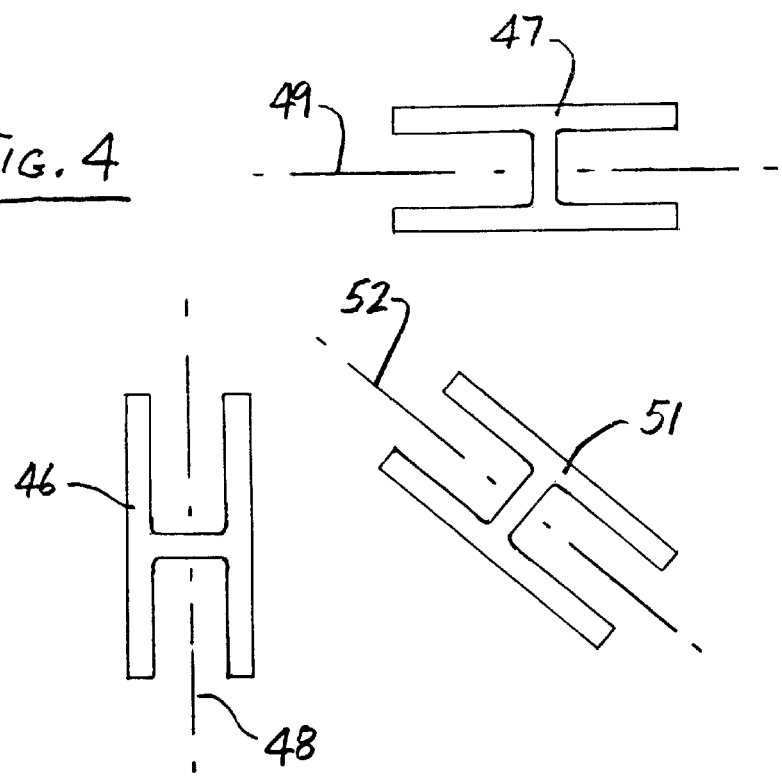

For example, in the embodiment illustrated in FIG. 4, two non-redundant rate sensing elements 46, 47, which are mounted with their axes 48, 49 perpendicular to each other, are both provided with a redundant signal from a sensing element 51 which has its input axis 52 oriented at an angle of 45° with respect to the axes of the two non-redundant elements. The sensing element oriented at 45° degrees to the two principal sensing axes can be used as a check on the performance of the primary sensing elements by comparing its output to the appropriate vector sum of the other two outputs. Here again, separate processing circuits provide an independent rate output signal for each of the sensing elements.

Figure 5:
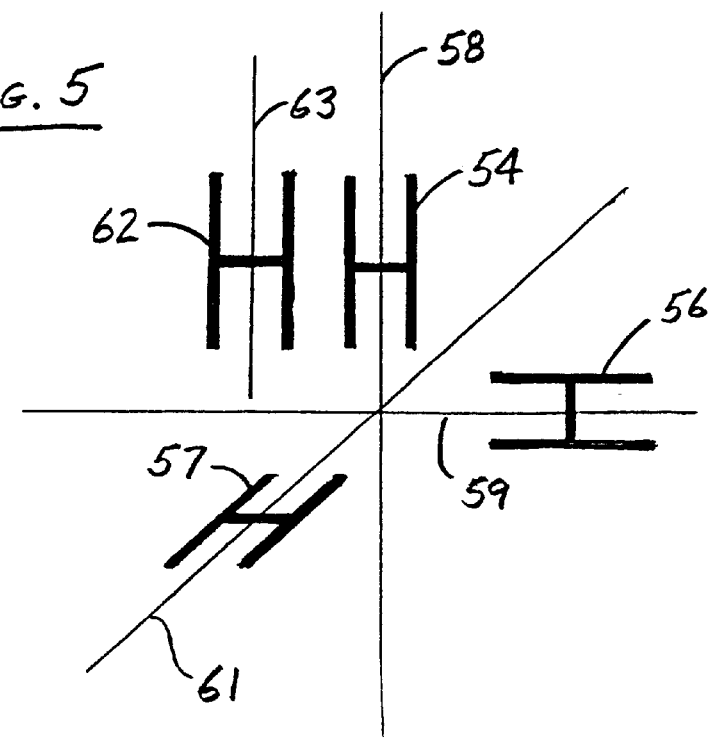

In the embodiment of FIG. 5, three sensing elements 54, 56, 57 have their input axes 58, 59, 61 perpendicular to each other, and a fourth sensing element 62 has its input axis 63 parallel to the input axis of sensing element 54 to provide redundancy for that sensing element.

Figure 6:
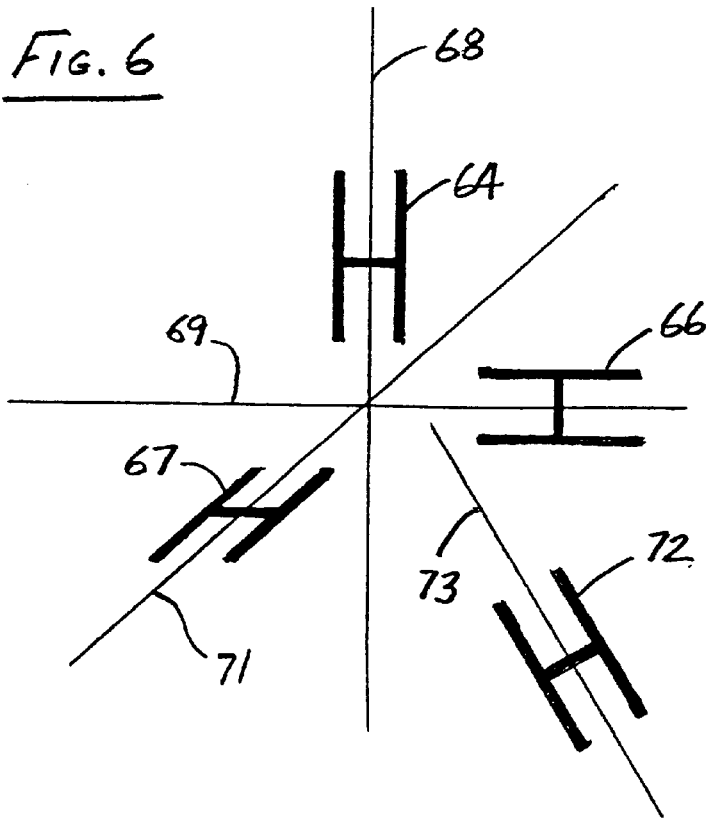

In the embodiment of FIG. 6, three sensing elements 64, 66, 67 have their input axes 68, 69, 71 perpendicular to each other, and a fourth sensing element 72 has its input axis 73 at a non-orthogonal angle relative to the input axes of at least two of the other three sensing elements. With this arrangement, the fourth sensing element provides redundancy for the two or three sensing elements to which its axis is not perpendicular.

The invention has a number of important features and advantages. With two sensing channels sharing a common printed circuit board, power conditioning circuitry, a single housing and common mechanical isolators, the overall cost of the two channels of rate output is substantially less than that of two separate rate sensor units. Moreover, with redundant sensors in a single package, only one mounting location, one set of connecting cables, one set of mounting bolts, and one installation procedure are required.

Moreover, with redundant sensors, a reduced level of accuracy can be tolerated in the redundant channel because that channel is only used for verifying that the output of the primary channel is valid. That tends to increase sensor yield during manufacture since not all of the rate sensing elements are required to meet the more stringent performance requirements of the primary channel. It also tends to improve the performance of the primary channel since the sensing elements with the best performance can be used in it. The net effect is to provide increased performance at reduced cost with the added reliability of redundancy.

The algorithm used to process the redundant outputs could consist, for example, of combining two redundant outputs as both sum and difference signals. The sum signal would be used as the primary output for vehicle stability control or other purposes, while the difference signal could be used to establish the validity of the output. A sensing element which performs much better than its specified requirement could be matched with one which is somewhat worse than that requirement. The sum of these two, effectively an average, could still be within the original specification error limit. If, however, the difference signal were to exceed a predetermined value, the system would detect a fault, and no erroneous braking actions would be performed.

It is apparent from the foregoing that a new and improved redundant rate sensor and method have been provided. While only certain presently preferred embodiments have been described in detail, as will be apparent to those familiar with the art, certain changes and modifications can be made without departing from the scope of the invention as defined by the following claims.

What is claimed is:

1. A redundant rate sensor, comprising an enclosure, a plurality of independent and separate vibratory rate sensing elements within the enclosure, an output connector accessible externally of the enclosure, and circuit means within the enclosure for processing signals from each of the sensing elements and delivering to the output connector an independent rate output signal for each of the sensing elements.

2. The redundant rate sensor of claim 1 wherein each of the vibratory rate sensing elements includes a tuning fork.

3. The redundant rate sensor of claim 2 wherein each of the tuning forks is fabricated of quartz.

4. The redundant rate sensor of claim 1 wherein each of the sensing elements is mounted on a common circuit board within the enclosure.

5. The redundant rate sensor of claim 4 wherein the circuit means is also mounted on the circuit board.

6. The redundant rate sensor of claim 1 including means within the enclosure for exciting each of the sensing elements at a different drive frequency.

7. The redundant rate sensor of claim 1 wherein each of the sensing elements has a drive frequency and a pickup frequency which are separated from each other by a predetermined amount, with the drive and pickup frequencies for different ones of the sensing elements being separated by different amounts.

8. The redundant rate sensor of claim 1 wherein the circuit means includes a separate processing circuit for each of the sensing elements.

9. In a method of sensing inertial rate, the steps of: monitoring inertial rate with a plurality of vibratory sensing elements mounted in a single enclosure, processing signals from the sensing elements to provide an independent rate output signal for each of the sensing elements, and delivering the independent rate output signals to a connector which is accessible externally of the enclosure.

10. The method of claim 9 wherein each of the sensing elements is excited at a different drive frequency.

11. The method of claim 10 wherein each of the sensing elements is operated at a drive frequency and a pickup frequency which are separated from each other by a predetermined amount, with the drive and pickup frequencies for different ones of the sensing elements being separated by different amounts.

12. A redundant rate sensor, comprising an enclosure, first and second vibratory rate sensing elements mounted in the enclosure with the input axes of the two sensing elements perpendicular to each other for sensing rotation about perpendicular axes, and a third vibratory rate sensing element mounted in the enclosure with the input axis of the third sensing element parallel to the input axis of the first sensing element to provide redundancy for the first sensing element.

13. The redundant rate sensor of claim 12 wherein each of the vibratory rate sensing elements includes a tuning fork.

14. The redundant rate sensor of claim 13 wherein each of the tuning forks is fabricated of quartz.

15. A redundant rate sensor, comprising an enclosure, first and second vibratory rate sensing elements mounted in the enclosure with the input axes of the two sensing elements perpendicular to each other, and a third vibratory rate sensing element mounted in the enclosure with the input axis of the third sensing element at a non-orthogonal angle relative to the input axes of the first and second sensing elements to provide redundancy for the first and second sensing elements.

16. The redundant rate sensor of claim 15 wherein each of the vibratory rate sensing elements includes a tuning fork.

17. The redundant rate sensor of claim 16 wherein each of the tuning forks is fabricated of quartz.

18. The redundant rate sensor of claim 15 wherein the axis of the third sensing element is at an angle of 45° relative to the input axes of the first and second sensing elements.

19. A redundant rate sensor, comprising an enclosure, three vibratory rate sensing elements mounted in the enclosure with the input axes of the three sensing elements perpendicular to each other for sensing rotation about perpendicular axes, and a fourth vibratory rate sensing element mounted in the enclosure to provide redundancy for at least one of the three sensing elements.

20. The redundant rate sensor of claim 19 wherein the input axis of the fourth sensing element is parallel to the input axis of one of the three sensing elements.

21. The redundant rate sensor of claim 19 wherein the input axis of the fourth sensing element is oriented at a non-orthogonal angle relative to the input axes of at least two of the three sensing elements.

* * * * *